US00RE45940E

(19) United States
(12) Reissued Patent
Dirix et al.

(10) Patent Number: US RE45,940 E
(45) Date of Reissued Patent: Mar. 22, 2016

(54) CONTINUOUS PROCESS FOR THE PRODUCTION OF VINYL CHLORIDE (CO)POLYMERS

(71) Applicant: AKZO NOBEL N.V., Arnhem (NL)

(72) Inventors: Carolina Anna Maria Christina Dirix, Diepenveen (NL); Johannes Jacobus Theodorus De Jong, Diepenveen (NL); Lambertus Meulenbrugge, Westervoort (NL); Koen Antoon Kornelis Vanduffel, Deventer (NL)

(73) Assignee: AKZO NOBEL N.V., Arnhem (NL)

(21) Appl. No.: 14/452,890

(22) Filed: Aug. 6, 2014

Related U.S. Patent Documents

Reissue of:
(64) Patent No.: 8,466,246
Issued: Jun. 18, 2013
Appl. No.: 12/293,517
PCT Filed: Mar. 20, 2007
PCT No.: PCT/EP2007/052612
§ 371 (c)(1),
(2) Date: Oct. 3, 2008
PCT Pub. No.: WO2007/110350
PCT Pub. Date: Oct. 4, 2007

U.S. Applications:
(60) Provisional application No. 60/787,528, filed on Mar. 31, 2006.

(30) Foreign Application Priority Data

Mar. 24, 2006 (EP) ..... 06111682

(51) Int. Cl.
*C08F 214/06* (2006.01)
*C08F 114/06* (2006.01)

(52) U.S. Cl.
CPC ..... *C08F 214/06* (2013.01); *C08F 114/06* (2013.01)

(58) Field of Classification Search
CPC ..... C08F 114/06; C08F 214/06
USPC ..... 526/344.2, 344, 65, 67
See application file for complete search history.

(56) References Cited

U.S. PATENT DOCUMENTS 3,004,013 A * 10/1961 Kirz et al. ..... B01J 19/1862 422/225
4,424,301 A 1/1984 Klippert et al.
4,433,099 A 2/1984 Kuepper et al.
4,579,923 A * 4/1986 Murray ..... 526/209
4,771,114 A * 9/1988 Kobayashi et al. ..... C08F 14/06 526/209
5,047,488 A 9/1991 Nogues et al.
5,578,689 A 11/1996 Nogues et al.
2003/0032747 A1 2/2003 Lee et al.

FOREIGN PATENT DOCUMENTS

CN 1031089 2/1989
JP 56-093710 A 7/1981
JP 56-118407 A 9/1981
WO WO 03/054040 7/2003
WO WO 2004/096871 11/2004
WO WO 2004096871 A1 * 11/2004

OTHER PUBLICATIONS

JP 56-093710 English Abstract (publication date Sep. 17, 1981).
JP 56-118407 English Abstract (publication dated Sep. 17, 1981).
JP 56-093710 Partial English translation (publication date Sep. 17, 1981).
JP 56-118407 Partial English translation (publication date Sep. 17, 1981).
Japanese Office Action dated Jul. 24, 2012 for related Application No. 2009-500846.
English translation for Japanese Office Action dated Jul. 24, 2012 for related Application No. 2009-500846.
S. M. Walas, "Chemical Reactors," *Perry's Chemical Engineers' Handbook, 7th* Edition, Section 23, 1997.
International Search Report, PCT International Application No. PCT/EP2007/052612, dated Jul. 10, 2007.
International Preliminary Repport on Patentability and Written Opinion of the Interantional Searching Authority, PCT International Application No. PCT/EP2007/052612, dated Jun. 27, 2008.
Response to Written Opinion for PCT International Application No. PCT/EP2007/052612, dated Dec. 21, 2007.
Letter from Zhongzi Law Office transmitting Chinese Office Action (not in English) for Chinese Patent Application No. 200780010363.1, dated May 26, 2010.

* cited by examiner

*Primary Examiner* — Timothy J. Kugel
(74) *Attorney, Agent, or Firm* — Alice C. Su

(57) ABSTRACT

Polymerization process comprising the steps of: (a) reacting an aqueous suspension comprising initiator, vinyl chloride, and optionally one or more co-monomers in a continuous stirred tank reactor; and (b) further reacting the resulting suspension in at least one second reactor; wherein the conversion level of vinyl chloride in the continuous stirred tank reactor of step (a) is from 10 to 60 wt %.

14 Claims, No Drawings

CONTINUOUS PROCESS FOR THE PRODUCTION OF VINYL CHLORIDE (CO)POLYMERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO RELATED APPLICATION(s)

This application is the U.S. National Phase of PCT/EP2007/052612 filed on Mar. 20, 2007 and claims the benefit of U.S. Provisional Application No. 60/787,528 filed on Mar. 31, 2006.

The present invention relates to a process for the suspension polymerization of vinyl chloride and optionally one or more co-monomers.

Vinyl chloride is usually polymerized via a bulk polymerization process, a solution polymerization process, an emulsion polymerization process or a suspension polymerization process. In a bulk polymerization process, the liquid portion of the reaction mixture predominantly contains monomer. The resulting polymer will be present in the reaction mixture as solid particles suspended in the liquid monomer.

In a suspension process, the liquid portion of the reaction mixture is a suspension of the monomer in water. The polymerization takes place in the suspended monomer droplets. For this process an initiator is selected that is poorly soluble in the water phase or at least preferentially soluble in the monomer phase.

In an emulsion polymerization process the polymerization takes place in the water phase, forming polymer particles from monomer dissolved in that phase. Monomer droplets are present as well, but essentially no polymerization takes place in these monomer droplets. An essentially water-soluble and monomer-insoluble initiator is required for this process.

The suspension polymerization process is often preferred over a bulk polymerization process because of the better heat transfer and the higher conversion that can be reached in suspension polymerization. The disadvantage of solution polymerization processes is that these require the removal of solvent from the polymer. The disadvantage of emulsion processes is that these require large amounts of surfactants. Furthermore emulsion polymerization of vinyl chloride generally results in different PVC properties than other types of polymerization processes.

Compared to other types of polymerization processes, the development of a suspension polymerization process is not straightforward. Especially if the initiator is dosed to the reactor at the reaction temperature, so-called "gels" or "fish eyes" are easily formed if the initiator has a low water solubility. The initiator in that case is not distributed evenly over the monomer droplets within the time needed to form a significant amount of radicals.

A continuous process for suspension polymerization of vinyl chloride is disclosed in U.S. Pat. No. 3,004,013. This prior art process uses two stirred reactors. Vinyl chloride monomer, lauroyl peroxide, polyvinyl alcohol, and water are added to the first reactor wherein part of the polymerization reaction takes place. In the second reactor, the reaction is continued and completed. The polymerization temperature used is 50° C.

The disadvantage of this prior art process is that either nearly all the peroxide used will end up in the final product or—if a sufficiently long mean residence time in the system is chosen to have a low residual peroxide level—the peroxide level and, hence, the conversion rate in the second reactor will be very low. The latter makes the process economically unattractive.

WO 03/054040 discloses a process to polymerize vinyl chloride monomer and optionally further monomers using one or more initiators, wherein an organic initiator with a half-life of from 0.0001 hour to 0.050 hour at the polymerization temperature is dosed to the polymerization mixture. This document suggests to conduct the polymerization in a (semi-)continuous manner by using a continuous tube-like reactor and adding the initiator at various addition points in the reactor, such that the polymerization rate is adequate until the next injection point. Such a process requires a multitude of controlling and addition points, and is therefore quite complicated.

Such (semi-)continuous polymerization processes are also described in U.S. Pat. No. 4,424,301. This reference describes a multi-stage polymerization process wherein use is made of tube reactors having a length over diameter of at least 4. The polymerization process of U.S. Pat. No. 4,424,301 is conducted in plug flow mode, which means that the conversion level is dependent on the position in the tube reactor(s), and increases as the reactant mixture progresses in the tube reactor. The disadvantage of tube-like reactors is that they are difficult to clean and stirring operations in a lube-like reactor are very complicated. However, dynamic mixing (stirring) is required at least during conversion of the first 20-50% of added monomer to obtain a polymer with the desired properties such as a good particle size distribution. Fouling of the reactor wall occurs easily during the first 20-50% conversion, despite special treatments such as the application of anti fouling agents.

It is an object of the present invention to provide an improved process for (co)polymerizing vinyl chloride.

This object is achieved by a polymerization process comprising the steps of:

(a) reacting an aqueous suspension comprising initiator, vinyl chloride, and optionally one or more co-monomers in a continuous stirred tank reactor; and (b) further reacting the resulting suspension in at least one second reactor;

wherein the conversion level of vinyl chloride in the continuous stirred tank reactor of step (a) is from 10 to 60 wt %.

The process of the invention, and in particular the conversion level in the continuous stirred tank reactor (CSTR), allow for the production of polyvinyl chloride or a copolymer thereof with a higher K-value compared to polymers obtained with conventional processes operated at the same average polymerization temperature. Therefore, the process can be conducted at a higher temperature, causing the reaction rate of the polymerization to be higher and the capacity of the production facilities to increase. A further advantage is the reduced initiator consumption compared to other processes where the same conversion level is reached using the same residence time/batch time. At the start-up of the polymerization reaction, i.e. at low conversion levels, the initiator consumption is considerably higher than when the polymerization reaction is conducted in continuous mode at a certain conversion level. In the process of the invention this start-up is only conducted once, whereas processes conducted in batch-wise mode go through the start-up every time a new batch is started, causing the initiator consumption to be significantly lower in a continuous process. Moreover, continuous processes where part of the polymerization reaction is conducted at conversion levels below 10 wt % consume more initiator than continuous processes conducted at the conversion levels of the instant invention. This, for example, is the case in the processes described in U.S. Pat. No. 4,424,301.

An additional advantage of the present process is that additional cooling capacity can be obtained from the addition of a feed, e.g. from the first CSTR, having a lower temperature than the polymerization temperature in the subsequent reactor. This allows for a higher polymerization rate in the subsequent reactor, and an increase in the overall production capacity.

In the context of the present invention, "conversion level" or "conversion level of vinyl chloride" refers to the weight ratio of the amount of polymer to the amount of polymer and vinyl chloride monomer. If co-monomers are present, the conversion level refers to the weight ratio of the amount of copolymer to the total amount of vinyl chloride, co-monomer(s), and copolymer. The conversion level is expressed in percent by weight or wt %. Conversion levels can be determined using the heat balance over the system, or by taking samples of the aqueous suspension in the reactor followed by gravimetrical analysis.

In the process of the invention, the conversion level in the CSTR generally is at least 10 wt %, preferably at least 15 wt %, and most preferably at least 20 wt %, and at most 60 wt %, preferably at most 50 wt %, and most preferably at most 40 wt %. Additional monomer is then polymerized in the reactor(s) downstream of this first reactor. The conversion level in the first CSTR is the steady state conversion level in the continuous operation of the CSTR, which means that the chosen rate of addition of (co)monomer(s), initiator, and optionally other ingredients to the CSTR and the chosen removal rate of the aqueous suspension from the CSTR result in a desired conversion level of the (co)monomer(s) in the CSTR.

In one embodiment of the present invention, the process uses at least two continuous stirred tank reactors (CSTRs) connected in series, wherein an aqueous suspension comprising initiator, vinyl chloride, and optionally one or more co-monomers is partly reacted in a first CSTR and the resulting suspension is fed through at least one downstream CSTR, and wherein at least one initiator with a half-life of 0.0001 to 1.0 hour, preferably at least one initiator with a half-life of 0.0001 to 0.5 hour, at the polymerization temperature is dosed to either the CSTR downstream of the first reactor or at least one of the CSTRs downstream of the first reactor.

This embodiment provides a process in which the amount of peroxide remaining in the final product is relatively low and which does not have the disadvantages associated with stirred tube-like reactors. Further, the largest part of the cooling capacity of the reactors can be utilized, resulting in good economics.

The second reactor may be any reactor known in the art. Generally, this second reactor is suitable for continuously producing polymers in accordance with the invention. Examples of suitable reactors are a continuous stirred tank reactor and a tube reactor. A second continuous stirred tank reactor is preferred.

The various reactors used in the process may have the same size or they may differ in size. The size of the reactor may be determined by the desired conversion level and/or the throughput in said reactor, which allows for further optimization of the present process.

If the second reactor is a CSTR, the suspension is transported from the first CSTR to an inlet of a second CSTR and, after that, optionally through further reactors, all connected in series. This transportation can be performed using a feed pump or by making use of a pressure difference between the reactors. A pressure difference over the transportation line from one reactor to the next will automatically result when the upstream reactor is fully filled with liquid, provided that use is made of a feed pump upstream of the reactor that exceeds the (highest) vapour pressure. It is also possible to operate one or more reactors that are not completely filled. In such cases other sources capable of creating a pressure difference between reactors can be used. A pressure difference is created if the temperature of the suspension in one reactor differs from that in the next, or at higher conversion levels when the pressure drops. The series of reactors preferably contains 2-5 CSTRs.

Alternatively or additionally, the transport of the suspension from one reactor to the next is facilitated by transport pumps. In a further embodiment the transport is controlled by valves reacting on the suspension levels in the reactor, or by pressure relief valves.

It is also envisaged that the outgoing feed of one reactor, in particular the CSTR of step a) of the process, is used to supply two or more reactors which may be positioned in respect of each other in parallel or in sequence. It is also envisaged that the last reactor in the sequence of reactors is a batch reactor. In such case the preceding reactor(s) serve(s) to fill the batch reactor. In the batch reactor, the polymerization proceeds and is finalized.

In the process according to the invention, water, initiator, vinyl chloride monomer (VCM), and optionally co-monomer(s) are continuously fed to a first CSTR. If desired, conventional additives for suspension polymerization may also be fed to this CSTR, such as surfactant(s), protective colloid(s), anti-fouling agent(s), and pH buffers. Anti-fouling agent(s) may also be applied in the reactor(s) prior to the start-up of the process.

The ingredients can be fed to the first CSTR individually. Alternatively, two or more of the ingredients can be mixed in a pre-reactor, after which the resulting mixture is fed to the first CSTR. It is also possible to pre-charge ingredients to one or more of the reactors before the start of the process.

Based on the total weight of monomer in the suspension, the VCM concentration preferably is at least 50 wt %, more preferably at least 80 wt %, and most preferably about 100 wt %.

Co-monomers that can be used are of the conventional type and include vinylidene chloride, vinyl acetate, ethylene, propylene, acrylonitrile, styrene, and (meth)acrylates. As is known in the art, the polymerization temperature of such processes to a large extent determines the molecular weight (commonly referred to as the K-value) of the resulting (co) polymer.

The initiator fed to the first CSTR can be any initiator suitable for the polymerization of vinyl chloride. Preferably, this initiator has a half-life of 0.0001 to 1.0 hour at the reaction temperature, although it is also possible to add one or more initiators with a longer half-life to this first CSTR. Preferably, the initiator has a half-life of 0.0001 to 0.5 hour at the reaction temperature. It is also envisaged to use a combination of two or more initiators, with at least one initiator having a half-life of 0.0001 to 1.0 hour, preferably of 0.0001 to 0.5 hour, at the reaction temperature.

The amount of initiator dosed to the first CSTR preferably is 50-2,000 ppm, based on the total mass flow rate of monomer entering this reactor.

A continuous stirred tank reactor (or CSTR) is defined as a tank-shaped reactor equipped with some means of agitation (e.g. stirring) into which reactants and optionally other components are introduced and from which the resulting reacted mixture is withdrawn continuously and/or intermittently, provided that the CSTR is not operated under plug flow conditions. By plug flow conditions is meant that the process is conducted in a reactor at a Peclet number of above 50, similarly to the processes conducted in tube-like reactors as disclosed in U.S. Pat. No. 4,424,301. Preferably, the CSTR is operated at a Peclet number of below 20, more preferably the Peclet number is below 15, even more preferably the Peclet number is below 10, more preferably still the Peclet number is below 5, and most preferably the Peclet number is below 2. The Peclet number is well known and applied in the art, and is explained for example by S. M. Walas in "Section 23: Chemical Reactors" in Perry's Chemical Engineers' Handbook, 7$^{th}$ edition, McGraw-Hill, 1997.

In one embodiment, ingredient streams can be introduced and/or withdrawn with varying flow rates. This can result in varying liquid levels of the CSTR during the process. It is desired that the liquid level in a CSTR in the period between (i) the initial filling of that CSTR at the start of the continuous process and (ii) the end of the continuous process does not change by more than a factor of 4, more preferably by not more than a factor of 2, most preferably by not more than 30%, relative to the time averaged liquid level of that CSTR during the continuous process.

If desired, the CSTRs may include any of the well-known geometrical aspects of batch PVC reactors, such as cooled baffles. Further, segmented CSTRs containing several mixing zones can be used. These mixing zones can be created by using multiple-stage radial pumping impellers.

Prior to introduction into a CSTR, feed(s) dosed to that CSTR—in particular the feed(s) dosed to the first CSTR—is/are preferably held at a temperature below the temperature of the suspension in that CSTR. This results in increased cooling of the CSTR, thereby allowing a higher conversion rate in the CSTR operating at the desired temperature. More preferably, the feed(s) is/are held at a temperature of at least 10° C. below the temperature of the suspension in the CSTR. Even more preferably, the feed(s) is/are held at a temperature of at least 20° C. below the temperature of the suspension in the CSTR. Stirring equipment and/or heat exchangers may be added to the feed lines and/or in dosing tanks in order to optimize efficiency.

The temperature in the first CSTR preferably ranges from 40 to 75° C.

If desired, a series of CSTRs may be followed by a tube reactor. Preferably, the average temperature in this tube reactor is at least 1° C., more preferably at least 2° C., yet more preferably at least 3° C. above the temperature of the most downstream CSTR. This will have the effect that the residual peroxide level in the resulting vinyl chloride (co)polymer is further reduced.

The heat of reaction in this tube reactor itself may (partly) be used for the temperature rise. A temperature rise is also useful for the successive step of degassing the reaction slurry.

Optionally, the temperature change over the length of the tube reactor may be controlled by means of a heat exchanging medium circulating through a shell around the tube reactor. The tube reactor may have the shape of a helix coil that is submerged in an—optionally stirred—tank filled with the heat exchanging medium.

The temperature in the second reactor downstream of the first CSTR, in particular of the further CSTR(s) downstream of the first CSTR, can be equal to the temperature in the first CSTR. Alternatively, the temperature in the first CSTR and the second reactor(s), in particular in the further CSTR(s), may differ. In one embodiment, the temperature in a downstream CSTR is lower—preferably by at least 2° C. and more preferably by at least 3° C.—than the temperature in the preceding CSTR. As explained above, this will result in a pressure difference between the reactors, thereby facilitating the transportation of the suspension from one reactor to the next.

In another embodiment, the temperature in a downstream reactor is higher—preferably by at least 3° C. and more preferably by at least 5° C.—than the temperature in the preceding reactor. This provides a higher cooling capacity of the downstream reactor due to the cold feed from the upstream reactor. This also reduces the half-life of the initiator in the downstream reactor, thereby reducing the residual peroxide level.

Optionally, a heat exchanger is present in between two reactors, in order to increase the cooling capacity of the overall system.

The initiator used in the process of the invention can be any initiator known in the art. In one embodiment of the invention, at least one initiator with a half-life at the polymerization temperature in the range 0.0001 to 1.0 hour is dosed to (any one of) the downstream reactor(s), in particular the second reactor. The half-life of this initiator at the polymerization temperature preferably is 0.0001 to 0.5 hour, more preferably it is 0.001 to 0.4, and most preferably 0.01 to 0.3 hour. In this specification, these initiators are referred to as "fast initiators".

It is also envisaged to activate a peroxide dosed in an upstream reactor in a more downstream reactor operated at a significantly higher temperature. To this end the temperature in a downstream reactor is at least 5° C., preferably at least 8° C., and most preferably at least 10° C. above the temperature of the reactor into which the initiator was dosed.

Suitable initiators are listed below. The half-lives of initiators at different temperatures can be determined by conventional thermal decomposition studies in monochlorobenzene, as is well known in the art (see for instance the brochure "Initiators for high polymers" with code 10737 obtainable from Akzo Nobel). The term "half-life at the polymerization temperature" in the present specification refers to the half-life at the suspension's temperature in the reactor with the highest temperature, provided that this temperature does not exceed 75° C. If the temperature of the suspension does exceed 75° C., the term "half-life at the polymerization temperature" refers to the half-life at 75° C. So, if three reactors are used in the process of the invention and the temperature of the suspension in these reactors is 50° C., 55° C., and 60° C., respectively, the half-life of the fast initiator is preferably between 0.0001 and 1.0 at 60° C.

| | Temperature (° C.) at which half-life is | | |
|---|---|---|---|
| Initiator | 0.01 hr | 0.05 hr | 0.3 hr |
| Diisobutyryl peroxide (Trigonox ® 187) | 78 | 63 | 48 |
| 1-(2-Ethylhexanoylperoxy)-1,3-dimethylbutyl peroxypivalate (Trigonox ® 267) | 84 | 69 | 53 |
| 1,1,3,3-Tetramethylbutyl perxyneodecanoate (Trigonox ® 423) | 98 | 82 | 67 |
| Teri-Butyl peroxyneodecanoate (Trigonox ® 23) | 106 | 90 | 74 |
| 1,1-Dimethyl-3-hydroxybutyl peroxyneodecanoate (Trigonox ® 193) | 96 | 80 | 64 |
| α-cumyl peroxyneodecanoate (Trigonox ® 99) | 96 | 81 | 65 |
| Di(4-tert-butylcyclohexyl)peroxydicarbonate (Perkadox ® 16) | 102 | 88 | 73 |

-continued

| Initiator | Temperature (° C.) at which half-life is | | |
|---|---|---|---|
| | 0.01 hr | 0.05 hr | 0.3 hr |
| Di(2-ethylhexyl)peroxyneodecanoate (Trigonox ® EHP) | 104 | 89 | 73 |
| Di-sec-butyl peroxydicarbonate (Trigonox ® SBP) | 103 | 88 | 73 |

Although organic peroxides are the preferred initiators in the process of the invention, redox initiation systems can also be used. In such a case the reducing agent, the oxidizing agent, or both can be dosed in accordance with the invention. Rather than by temperature, the rate of formation of free radicals for redox systems is often determined by the dosing rate of the components and the time it takes for the components to be mixed. Therefore, in determining the half-life at the polymerization temperature for redox systems, a time required to mix the components has to be accounted for. For redox systems, the half-life at the polymerization temperature is the half-life as measured when all components of the system are present plus a typical mixing time in a stirred tank reactor of 0.01 hr.

However, in view of the fact that redox systems typically contain heavy metals and/or undesired reducing agents, the initiators of the present invention preferably are not such redox initiation systems.

Preferred fast initiators are diisobutyryl peroxide, 1,1-dimethyl-3-hydroxybutyl peroxyneodecanoate, tetramethylbutyl peroxymethoxyacetate, tert-amyl peroxymethoxyacetate, and mixtures thereof. The most preferred fast initiator is diisobutyryl peroxide.

Although less preferred, it is further possible to add, apart from the fast initiator, one or more initiators with a half-life at the polymerization temperature outside the range of 0.0001-1.0 hour.

The total amount of initiator to be used in the process according to the invention is within the range conventionally used in polymerization processes. Typically, from 0.01 to 1 wt % of initiator, more specifically 0.01-0.5 wt %, based on the weight of the monomer(s) to be polymerized, is used.

It is to be understood that the word "dosing" is used to describe the step of adding fast initiator to the aqueous suspension at polymerization conditions. This dosing can be done intermittently or continuously.

If dosed intermittently, the fast initiator is added to the CSTR or other type of reactor in at least 2, preferably at least 10, more preferably at least 30, and most preferably at least 100 portions during the process of the invention. These portions are preferably dosed with intervals between the portions of less than 2 times the mean residence time, more preferably less than 0.5 times the mean residence time, and most preferably less than 0.1 times the mean residence time. The mean residence time is defined as the average content, in kg, of the reactor to which the addition is made divided by the total average flow rate, in kg/hr, of all streams added to that reactor.

The fast initiator can also be dosed continuously. Alternatively, a combination of continuous and intermittent dosing is used. An example of such a combination is a process in which periods of continuous addition alternate with periods wherein the addition of fast initiator is interrupted.

Preferably, the dosing of fast initiator can be effected at any suitable entry point to the reactor(s). It can be advantageous to use the line through which this water is dosed to also dose the fast initiator. It is noted that if the formation of the initiator is fast enough, one can dose the raw materials for said initiator into piping or hold-up vessels, from which the fast initiator is then dosed to the reactor(s). Alternatively, but less desirably, one can add the raw materials to prepare the fast initiator to the aqueous suspension.

The fast initiator is dosed in pure form or, preferably, in the form of a dilute solution or dispersion. One or more suitable solvents can be used to dilute the initiator. Preferably, such solvents are easily removed during the work-up of the polymer after the polymerization process, or they are of such a nature that it is acceptable to leave them as a residue in the final polymer. Furthermore, such solvents preferably do not adversely affect the thermal stability of the fast initiator dissolved therein, as can be verified by analyzing the half-life temperature of the initiator in said solvent. An example of a suitable solvent is isododecane. If an initiator dispersion is dosed, then the dispersion can be of either the fast initiator itself or of a solution of the fast initiators preferably in said suitable solvents. Preferably, the dispersion is an aqueous dispersion. More preferably, the dispersion is an aqueous dispersion with a medium droplet size below 10 microns. That allows a better distribution of initiator over the VCM droplets.

Preferably, the fast initiator is dosed in a concentration of 1 to 70 wt %, more preferably 20 to 65 wt %.

It is preferred that at least one, but preferably all of the dosed initiator(s) has/have a solubility in water of at least 5 ppm, more preferably at least 50 ppm, and most preferably at least 200 ppm. This will increase the mass transfer of the initiator to the VCM droplets, thereby reducing the formation of fish eyes.

Apart from the initiator(s), other ingredients may be added to the second and further reactors, such as VCM, co-monomers, water, surfactant(s), protective colloid(s) (e.g. polyvinyl alcohol), anti-fouling agent(s), pH-buffer(s), dispersants, and other additives that are usually added to PVC production processes, so as to to obtain effects well known in classical PVC suspension polymerization, for instance, to influence porosity, bulk density, particle size, etc.

The residence time of the suspension in the series of reactors preferably is in the range of 1 to 10 hours.

After leaving the last reactor, the resulting (co)polymer suspension is collected in a blow-down vessel, after which it is transported to a (continuous) degassing and/or drying section. One of the advantages of the process of the invention is that, in combination with continuous downstream processing, collection of the (co)polymer suspension in a blow-down vessel is not required.

Optionally, however, a blow-down vessel may be used. In such case part of the degassing can be performed in the blow-down vessel.

In one embodiment of the invention, the monomer conversion level (that is the conversion level in the most downstream reactor) is lower than would be economically attractive as a final conversion level in classical PVC suspension polymerization processes. Typically, the overall conversion level is below 80 wt %, preferably below 75 wt %, and most preferably below 70 wt %. The lower final conversion level has the advantage that the thermal and colour stability of the resulting PVC is improved. Moreover, the reactor capacity increases due to the increased latent heat of the reaction components per weight unit (kg) of converted monomer.

It is also contemplated to add additional water to one or more of the reactors to increase the cooling capacity (direct cooling) and to increase the polymerization rate and production capacity.

In a specific embodiment, at least one and preferably all of the reactors, i.e. the first CSTR and second reactor(s), in particular further CSTRs or a batch reactor, used in the process is/are equipped with a (reflux) condenser to provide additional cooling.

In an embodiment comprising more than one CSTR, the reflux of any of these condensers is returned to another reactor. Preferably, the reflux from the condenser(s) of one or more reactors downstream of the first CSTR can be returned to a more upstream reactor, most preferably to the first CSTR.

In another embodiment of the invention, at least the most downstream reactor is equipped with a condenser of which the reflux is returned to any one of the more upstream reactors. This will help to operate the most downstream reactor under so-called pressure drop conditions, i.e. conditions at which the pressure in the reactor is below the vapour pressure of the vinyl chloride monomer. This will compensate for the effects of residence time distribution, because it allows the monomer from monomer-rich droplets to dissolve in the aqueous phase. Returning the reflux from a condenser to another reactor can also be done to influence any of the properties of the resulting (co)polymer, such as the porosity and the bulk density.

Various start-up and shutdown procedures of the continuous process can be defined to optimize the economy of the process and the quality of the product. In one embodiment, for example, a reactor, preferably a CSTR, situated upstream of the CSTR of step a) is operated at a conversion level below 10 wt %.

After the polymerization, the resulting (co)polymer will be worked up as is usual in the art. The (co)polymer obtained by the process of the invention can, for example, be submitted to the usual drying and screening steps.

With the process according to the invention, (co)polymers with excellent heat stability can be prepared. This heat stability can be measured with a testing oven according to method ASTM 1925. The (co)polymer hardly discolours when submitted to melt-processing steps, e.g., to form shaped articles.

The present invention is illustrated in the following Examples.

EXAMPLES

Example 1

A continuous suspension PVC polymerization was earned out using two stainless steel 10 l Büchi autoclaves with an inner diameter of 18 cm. Each autoclave was provided with: one baffle; a temperature sensor; two flat-bladed stirrers of ⅓ of the vessel diameter, about one stirrer diameter apart, a pressure transducer, a level sensor, a vinyl chloride monomer (VCM) feed line, a nitrogen purge line, a water feed line and a water/PVA feed line and a peroxide feed line.

Dosing pumps for VCM, water, PVA solution, and initiator were connected to the first reactor A second initiator dosing pump was connected to the second reactor.

The two reactors were connected by means of a 10 mm stainless steel line, running from a dip tube in the first reactor via an automatic ball valve to the top of the second reactor. The second reactor also contained a dip pipe, connected via a 10 mm steel tube to a 300 ml metering vessel between two automatic ball valves. The metering vessel served to discharge portions of polymer suspension to a stripping section.

The first reactor was loaded with 2 l water containing about 0.47 g Alcotex B72 (PVA ex Harco) and 0.08 g Gohsenol GH 23 (PVA ex Nippon Gohsei). Subsequently the reactor was pressurized with nitrogen at about 15 bara. After that, the reactor was evacuated for 3 minutes at 75 mm Hg, and 700 grams of VCM were added.

The second reactor followed the same procedure, but was charged with 2 l containing half the amount of PVAs and about half the amount of VCM (300-350 g) was added.

The stirring speed in both reactors was 800 rpm.

When the reactor had been heated to the desired reaction temperature the VCM, water, PVA, and peroxide dosing was started, in this case a VCM flow or 1.35 kg/h was used together with in total 3 l water/h and PVAs in the ratio of 700 ppm Alcotex to 115 ppm Gohsenol based on the VCM/h.

The initiator used in the current process was Tx 187-W26 (a 26% emulsion of di-isobutyryl peroxide in water ex Akzo Nobel Polymer Chemicals). The initiator was dosed at 1.56 g/h (neat isobutyryl peroxide emulsified in water) for 45 minutes. Then the dosing rate was set to 0.31 g/h. During the first period the first reactor was run at a higher temperature (i.e. 59° C. instead of 57° C.) until the second reactor reached pressure drop. After that the reactors were both kept at 57° C. When a predefined level was reached (65%), the automatic valve opened and a first amount of the slurry was transferred to the second reactor. From this moment the initiator dosing to the second reactor was started. Until the pressure dropped, 1.56 g/h (neat di-isobutyryl peroxide) was dosed, then the dosing rate was reduced to 0.6 g/h to maintain an average pressure drop of 0.5-1 bar in the second reactor. Thus, in the steady state process the total initiator dosing was 0.39 g/h (neat di-isobutyryl peroxide) for 1.35 kg/h VCM.

Each time that predefined level in the second reactor (65%) was reached, the automatic valves to the metering vessel opened and fixed amounts were transferred to a collection vessel, where the slurry was degassed and evacuated. In this way a more or less constant level (+/−5%) was maintained in both reactors. The total average residence time in both reactors—equally divided over both reactors—was 2.4 hours.

After reaching steady state, the particle size distribution of produced PVC remained constant with $D_{50}$=150 μm (volume median diameter, measured with a Coulter counter). The DOP porosity was 23%. The K-value of the produced PVC is 69, where normally at 57° C. PVC with a K-value of about 67 is made using a classical batch process.

Example 2

In Example 2 the first reactor was filled with 3 l water containing 0.95 g Alcotec B 72, 0.16 g Gohsenol GH23, and 1350 g VCM. The second reactor was filled with 3 l water containing 0.48 g Alcotec B 72, 0.08 g Gohsenol GH23, and 300 g VCM. The procedure in this Example was the same as that followed in Example 1.

Example 3

The same procedure was followed as in Example 2, except that in the second reactor also PVA was dosed at a rate of 350 ppm Alcotex B72 and 60 ppm Gohsenol GH23 based on the VCM dosed per hour.

The conversion level in the first reactor as well as the total peroxide consumption of Examples 1-3 is shown in Table 1.

TABLE 1

| Example | Conversion in 1st reactor (wt %) | Total peroxide consumption (ppm on VCM) | Yield (%) |
|---|---|---|---|
| 1 | 28 | 780 | 67 |
| 2 | 26 | 810 | 64 |
| 3 | 21 | 780 | 64 |

In Table 2 various properties of the PVC product are shown.

TABLE 2

| Example | K value | $D_{50}$ (μm) | Bulk density (g/l) | Porosity (%) |
|---|---|---|---|---|
| 1 | 69 | 151 | 430 | 23 |
| 2 | 71 | 150 | 457 | 22 |
| 3 | 70 | 150 | 510 | 19 |

The invention claimed is:

1. A polymerization process comprising the steps of:

(a) reacting an aqueous suspension comprising an initiator and vinyl chloride, in a continuous stirred tank reactor; and (b) further reacting the resulting suspension in at least one downstream reactor;

wherein the conversion level of vinyl chloride in the continuous stirred tank reactor of step (a) is from 10 to 40 wt %, *wherein the at least one downstream reactor is at least one downstream continuous stirred tank reactor, wherein the continuous stirred tank reactor of step (a) and the at least one downstream continuous stirred tank reactor are connected in series, wherein the process is conducted continuously and wherein the aqueous suspension resulting from step (a) is fed to the at least one downstream continuous stirred tank reactor, and wherein at least one initiator with a half-life of 0.0001 to 0.5 hour at the polymerization temperature is dosed to at least one of the at least one downstream continuous stirred tank reactors.*

2. The polymerization process according to claim 1, wherein the conversion level is from 20 to 40 wt %.

3. The polymerization process according to claim 1, wherein the *continuous stirred tank reactor and the* at least one downstream reactor [is selected from a second continuous stirred tank reactor, a tube reactor or a batch reactor] *each have a Peclet number below 5.*

4. The polymerization process according to claim 1, wherein the [polymerization process is conducted continuously] *continuous stirred tank reactor and the at least one downstream reactor each have a Peclet number below 2.*

[5. The polymerization process according to claim 1, wherein the at least one downstream reactor is at least one downstream continuous stirred tank reactor, wherein the continuous stirred tank reactor of step (a) and the at least one downstream continuous stirred tank reactor are connected in series, wherein the process is conducted continuously and the aqueous suspension resulting from step a) is fed to the at least one downstream continuous stirred tank reactor, and wherein at least one initiator with a half-life of 0.0001 to 0.5 hour at the polymerization temperature is dosed to at least one of the at least one downstream continuous stirred tank reactors.]

6. The polymerization process according to claim [5] *1*, wherein at least one of the continuous stirred tank reactors is equipped with a condenser.

7. The polymerization process according to claim 1, wherein the at least one downstream reactor is at least one continuous stirred tank reactor downstream of the continuous stirred tank reactor of step (a) equipped with a reflux condenser, and wherein the reflux of said condenser flows to a more upstream reactor.

8. The polymerization process according to claim [5] *1*, wherein the at least one initiator has a half-life of 0.001 to 0.4 hour at the polymerization temperature.

9. The polymerization process according to claim 8, wherein the at least one initiator has a half-life of 0.01 to 0.3 hour at the polymerization temperature.

10. The polymerization process according to claim 7, wherein the more upstream reactor is the [first] continuous stirred tank reactor *of step (a)*.

11. The polymerization process according to claim 1, wherein the aqueous suspension further comprises one or more co-monomers.

12. The polymerization process according to claim [2] *9*, wherein the [at least one downstream reactor is selected from a second continuous stirred tank reactor, a tube reactor or a batch reactor] *continuous stirred tank reactor and the at least one downstream reactor each have a Peclet number below 5.*

13. The polymerization process according to claim [2] *12*, wherein the [polymerization process is conducted continuously] *continuous stirred tank reactor and the at least one downstream reactor each have a Peclet number below 2.*

14. The polymerization process according to claim [3] *10*, wherein the [polymerization process is conducted continuously] *continuous stirred tank reactor and the at least one downstream reactor each have a Peclet number below 5.*

15. The polymerization process according to claim [11] *14*, wherein the [at least one downstream reactor is at least one downstream continuous stirred tank reactor, wherein the continuous stirred tank reactor of step (a) and the at least one downstream continuous stirred tank reactor are connected in series, wherein the process is conducted continuously and the aqueous suspension resulting from step a) is fed through the at least one downstream continuous stirred tank reactor, and wherein at least one initiator with a half-life of 0.0001 to 0.5 hour at the polymerization temperature is dosed to at least one of the at least one downstream continuous stirred tank reactors] *continuous stirred tank reactor and the at least one downstream reactor each have a Peclet number below 2.*

[16. The polymerization process according to claim 15, wherein at least one of the continuous stirred tank reactors is equipped with a condenser.]

[17. The polymerization process according to claim 15, wherein the at least one initiator has a half-life of 0.001 to 0.4 hour at the polymerization temperature.]

[18. The polymerization process according to claim 17, wherein the at least one initiator has a half-life of 0.01 to 0.3 hour at the polymerization temperature.]

* * * * *